United States Patent Office 3,105,412
Patented Oct. 1, 1963

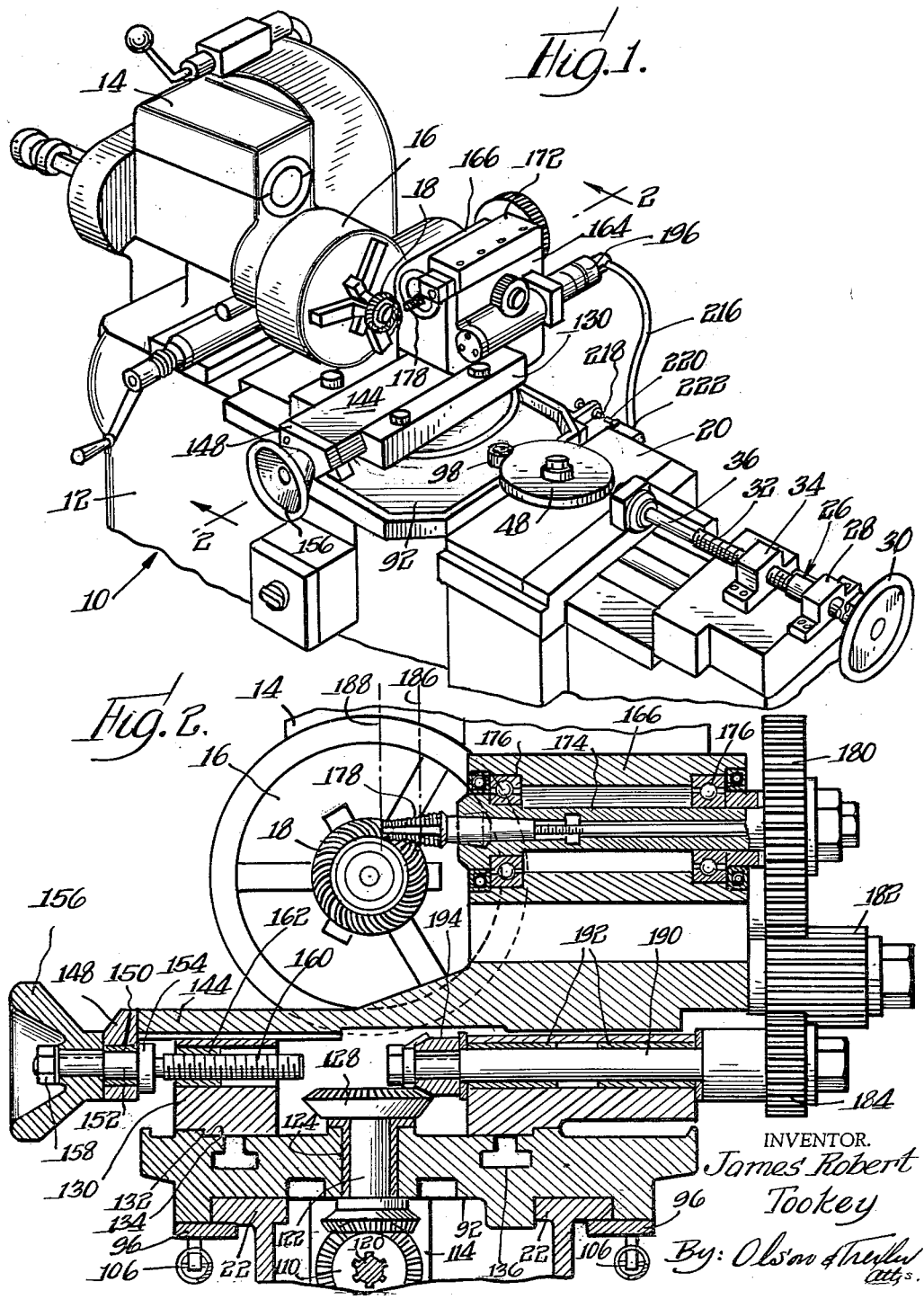

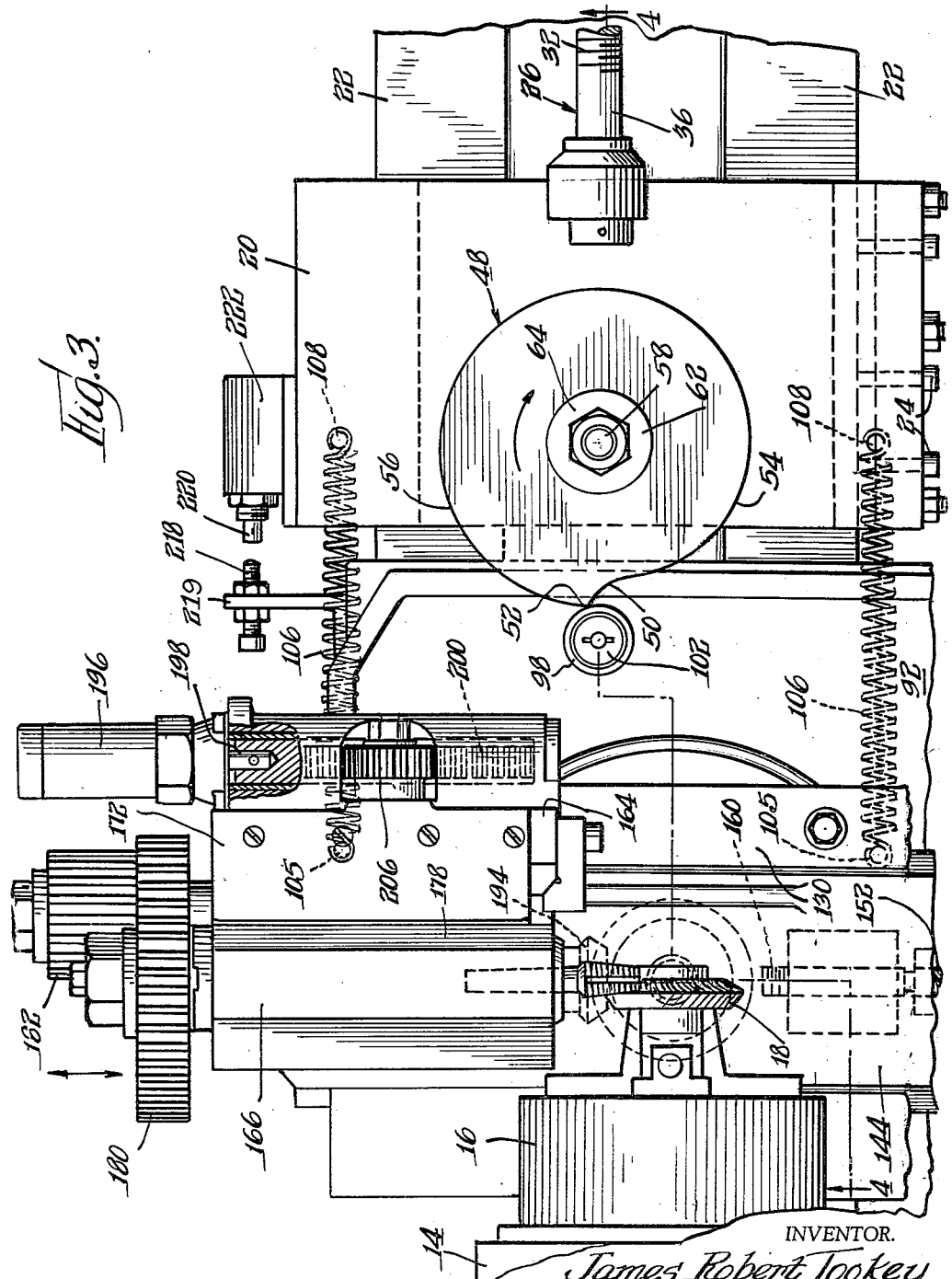

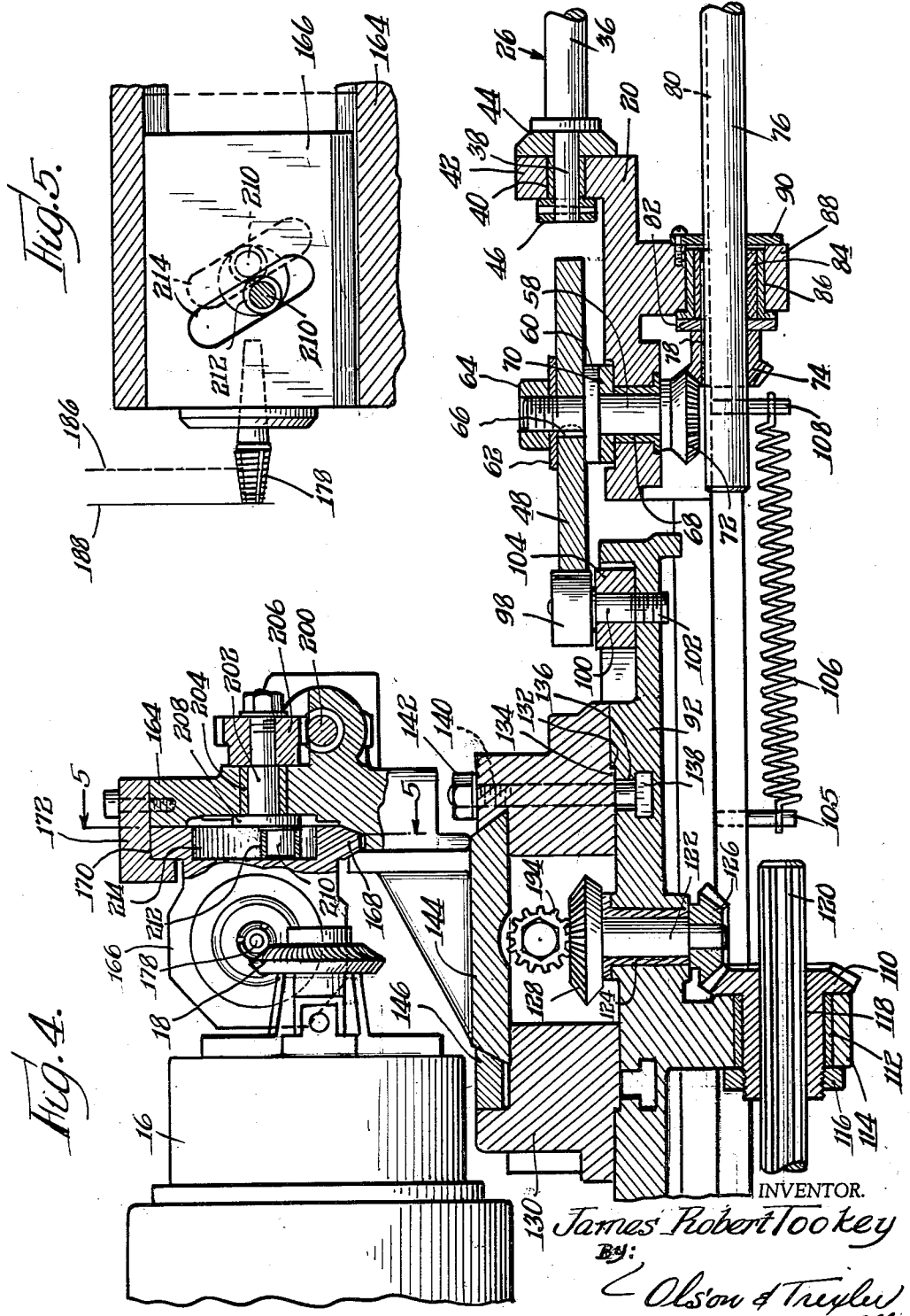

3,105,412
HOBBING MACHINE
James Robert Tookey, Rolling Meadows, Ill., assignor to Illinois Tool Works Inc., a corporation of Delaware
Filed July 7, 1958, Ser. No. 746,734
4 Claims. (Cl. 90—4)

This invention is concerned with the machine tool art, and more particularly with an improved hobbing machine.

Conventional hobbing machines usually are provided with lead screws for advancing the tool or hob carriage toward the workpiece, and also with a similar mechanism for advancing the hob relative to the hob carriage. Such devices generally have effected uniform advance, and lead screws are generally incapable of effecting anything but uniform advance. Although such uniform advance is suitable for many types of gears, it is not suitable for all types. For example, certain face type worm gears require that the hob be advanced relatively rapidly, and have a dwell period at the end for finishing of the gear. Prior machines have not been capable of producing the necessary movement.

Accordingly, it is an object of this invention to provide a mechanism, specifically a cam mechanism, for advancing a hob carriage relatively rapidly toward a workpiece, and then maintaining the hob carriage in fixed position for predetermined time.

It is another object of this invention to provide a hobbing machine in which the hob is advanced axially of the hob relative to the hob carriage rather rapidly, followed by a dwell and a rapid retraction.

Another object of this invention is to provide a hobbing machine in which the hob is advanced and retraced transversely as well as axially.

Other and further objects and advantages of the present invention will be apparent from the following description when taken in connection with the accompanying drawings wherein:

FIG. 1 is a perspective view of a hobbing machine embodying the principles of the invention;

FIG. 2 is a vertical sectional view taken substantially along the lines 2—2 in FIG. 1;

FIG. 3 is a fragmentary plan view showing the novel parts of the machine;

FIG. 4 is a vertical sectional view taken along the line 4—4 in FIG. 3; and

FIG. 5 is a detail vertical sectional view somewhat similar to a part of FIG. 2.

Referring now in greater particularity to the drawings, and first to FIG. 1 there will be seen a hobbing machine identified generally by the numeral 10. Many of the parts of the hobbing machine are quite conventional, and extensive description of such parts is unnecessary. The hobbing machine comprises a base 12 having an upstanding head 14 comprising the usual supports and drive mechanisms for a work chuck 16 carrying a workpiece 18. The workpiece starts out as a gear blank, and ends up as a finished face type worm gear.

Departing from the ordinary, the hobbing machine also includes a cam base plate 20 which adjustably clamps to fixed portion or rails 22 of the machine by means including bolts 24 (see also FIGS. 3 and 4). An adjustment or lead screw or shaft 26 is rotatably and slideably journalled in a bearing block 28 on a fixed part of the machine, and is provided at its outer end with a hand wheel 30. The adjustment shaft 26 further is provided with an intermediate threaded portion 32 which is threaded through a fixed block 34 on the machine. Rotation of the hand wheel advances or retracts the shaft 26 due to the threaded engagement with the block 34. The end of the shaft opposite the hand wheel is threadless as at 36, and has a reduced diameter extension 38 (FIG. 4) extending through a sleeve bearing 40 in an upstanding lug 42 on the cam base plate 20. Washers 44 are interposed between the shaft portion 36 and the lug 42, and an anchor block or washer 46 is pinned on the end of the extending portion 38 to prevent longitudinal movement of the shaft 26 relative to the lug 42, and hence relative to the cam base plate 20.

Thus, with the clamp means for the plate 20 loosened, the cam plate can be adjusted in position by turning the hand wheel 30.

A cam 48 is mounted in horizontal position and appears to be more or less spiral in outline. However the cam 48 is not of constant lead. The cam is provided with a lead-in or drop off 50 from a node 52, succeeded by an active portion 54. The first 20 or 30 degrees of the active portion has a rapidly changing radius for rapid feeding followed by a more gradually changing radius, finally joining a cylindrical or circular dwell portion 56 leading to the node 52.

The cam 48 is fixed on the reduced upper end of a stub shaft 58, being keyed thereto at 66 and secured against a circumferential flange or washer 60 by a washer 62 and a nut 64 threaded on the upper end of the shaft 58. The shaft is journalled in a sleeve bearing or bushing 68 mounted in the plate 20, and a thrust washer 70 is interposed between the flange 60 and the top of the sleeve bearing 68, the washer being partially recessed in the top of the plate 20. A bevel gear 72 is fixed on the bottom end of the stub shaft 58, and meshes with a bevel gear 74 mounted on a horizontal shaft 76 and keyed thereto by a key 78 received in an extended keyway 80. The shaft 76 corresponds to the lead screw in a conventional hobbing machine, and is driven by a suitable mechanism (not shown) in timed relation with the workpiece 18.

A thrust bearing or washer 82 and a bearing sleeve 84 are keyed to the shaft 76 along with the bevel gear 74. The bearing sleeve 84 is journalled in a sleeve bearing or bushing 86 mounted in a depending flange 88 on the plate 20. A cover plate 90 is secured against the side of the flange 88 and surrounds the shaft 76. The arrangement is such that the bevel gear 74 is at all times in driving engagement with the bevel gear 72, but is free to move relative to the drive shaft 76 upon adjustment of the position of the cam plate 20.

Returning now to more conventional parts of the hobbing machine, there will be seen a hob carriage 92 mounted on the rails 22 and secured thereon by hold-down plates 96 (FIG. 2) underlying the rails. The hob carriage is altered from the usual construction in having a cam follower 98 thereon engageable with the cam 48. The follower 98 is of known construction, including a roller rotatably mounted on a stud 100 having the lower end thereof threaded as at 102 into the hob carriage 92. A spacer 104 is interposed between the hob carriage and the roller.

Pins 105 depend from the hob carriage 92, and springs 106 are stretched between these pins and similar pins 108 depending as from the cam base plate 20. The springs 106 maintain the follower 98 in engagement with the periphery of the cam 48.

A bevel bear 110 (FIGS. 2 and 4) is journalled as in a sleeve bearing 112 in a depending lug or flange 114 beneath the hob carriage 92. A nut 116 is threaded on the extending hub 118 of the gear to secure the gear against axial movement in the lug or flange 114. Hence, the gear will move axially with the hob carriage 92. The gear 110 is driven by a spline shaft 120 which is axially movable relative to the gear, and which is driven in timed relation with the workpiece 18. As will be understood, the speed of the shaft 76 will be adjusted relative to the speed of the shaft 120 and the workpiece 18 to determine the proper feed rate for any given set up, and thereafter, in a sense, has a timed relation with the shaft 120 and the workpiece 18.

A stub shaft 122 is rotatably journalled in a sleeve bearing 124 in vertical position in the carriage 92, and carries at its lower end a bevel gear 126 meshing with the bevel gear 110. A bevel gear 128 is fixed at the top of the stub shaft 122, and cooperates with further parts driven thereby, as will be set forth hereinafter.

A cross-slide bed 130 is mounted on the carriage 92 for swivelling about the axis of the stub shaft 122. The carriage is provided with a circular recess 132 receiving a downwardly projecting complementary portion 134 on the cross-slide bed. In addition, the carriage 92 is provided with a circular track 136 of inverted T-shape in cross section, and heads or cross members 138 of bolts 140 are received therein, the bolts 140 extending up through the cross-slide bed 130 and having nuts 142 on the upper ends thereof. As will be apparent, the bolts hold the cross-slide bed down on the carriage, and permit swivelling thereof when the nuts are suitably loosened. The swivelling feature is old in the art, and is useful for hobbing gears when the machine is to be used with gears and hobs having axes at different angles, according to the particular gears and hobs being used.

A cross slide 144 is mounted on the cross-slide bed by the usual dove tail arrangement, including a clamping plate or gib 146. A depending flange or plate 148 (FIG. 2) is secured to the end of the cross-slide and is provided with a sleeve bearing 150 journalling an adjustment shaft 152. A collar 154 is fixed to the shaft adjacent the plate or flange 148 to prevent retraction of the adjustment shaft 152, and a hand wheel 156 is secured to the outer end of the shaft, being keyed thereto and secured by a nut 158. The inner end of the adjustment shaft 152 is threaded as at 160, being received by a nut member 162 fixed in the cross-slide bed 130. Hence, rotation of the hand wheel 56 effects adjustment of the cross-slide 144.

The cross-slide is provided with an upstanding head 164. A hob spindle housing 166 is carried thereby for adjustment in the longitudinal direction of the cross-slide. The housing 166 is provided along one side with a depending flange 168 (FIG. 4) received a complementary groove in the head 164. An upstanding flange 170 is parallel thereto at the upper portion of the housing, and an L-shaped plate or bracket 172 bolted on the top of the head 164 slidingly secures this flange.

A hob spindle 174 (FIG. 2) is journalled in the housing 166 by means of suitable anti-friction bearings 176 and carries the hob 178 for finishing the workpiece or gear 18. A gear 180 is fixed on the opposite end of the hob spindle, and meshes with an idler gear 182. The idler gear is driven by a gear 184. The gears 180 and 184 are relatively shallow in axial extent, while the gear 182 is of much larger axial length. The hob spindle and housing are advanced during a machine or hobbing cycle, and more particularly just before a hobbing operation, from the broken line position shown at 186 in FIG. 2 to the position indicated by the broken line 188. The elongation of the idler gear 182 provides for constant engagement of the gears 180 and 182 during such advancement. Similarly, the slide 144 can be adjusted to the left of the position shown in FIG. 2, and the length of the gear 182 insures that this gear will at all times mesh with the gear 184.

The gear 184 is fixed on a horizontal shaft 190 journalled in suitable sleeve bearings 192 in the cross-slide bed 130. A bevel gear 194 is fixed on the opposite end of the shaft 190 and meshes with the bevel gear 128 for driving of the shaft 190.

The head 164 is provided with an air piston 196, the piston rod 198 (FIG. 3) of which is connected to a rack 200 (FIGS. 3 and 4). A stub shaft 202 (FIG. 4) is journalled in a sleeve bearing 204 in the head 164, and a pinion 206 is fixed on the reduced extending end of the stub shaft. The pinion meshes with the rack 200, whereby the shaft 202 is rotated upon reciprocation of the rack 200. At the opposite end of the shaft 202 there is a plate or flange 208 having a crank pin 210 thereon. The crank pin is provided with an anti-friction cylindrical roller 212.

As will be seen in FIG. 5, the hob spindle housing 166 is provided with a diagonal cam slot 214. This slot is straight in the illustrative embodiment, although it could be curved, and runs diagonally upwards from right to left, or from the rear to the front of the housing. When the crank pin 210 is in the broken line position shown in FIG. 5, the hob, spindle, and housing are in retracted position. This is indicated by the broken line 186, as in FIG. 2. When the crank pin 210 rotates in a counterclockwise direction upon retraction of the rack, the forward movement of the hob and related parts is at first rather rapid, due to the angular relation of the path of movement of the crank pin and of the position of the cam slot 214. However, the path of movement of the crank pin shortly is such that the angle of the cam slot 214 is substantially tangent thereto. Thus, the advance slows considerably, and eventually the hob stops in its fully advanced hobbing or working position, as indicated by the line 188. The counterclockwise movement for hob advance is quite important as it causes the crank pin to bear down in the hob spindle housing and hence lock the housing firmly against the ways in the head 164.

Novel parts of the machine that have not been mentioned heretofore include an air line 216 connected to the piston 196, and a stop 218 comprising a bolt threaded through a rearwardly projecting ear 219 on the carriage 92 and locked in place therein by a pair of nuts. The stop is engageable with the actuating member 220 of a stop switch 222.

The machine is set up for operation with the hob 178 in retracted position, and with the workpiece 18 secured in position in the chuck 16. A suitable control (not shown) is operated to start the machine in operation. This causes rotation of the workpiece, rotation of the hob through the various connections described from the spline shaft 120, and rotation of the cam 48 by means of the shaft 76. Such operation all is in the proper timed relation, as will be understood. The cam 48 is at the low spot at 50, and rotation of the cam advances the carriage to feed the hob laterally of itself into engagement with the workpiece. In this manner the cam 48 moves the carriage or slide 92 away from its idle station, in which the hob 178 clears the workpiece 18, into a working zone in which the hob engages and is fed into the workpiece. The advancement at first is rapid, since only the tips of the teeth of the hob are engaging the workpiece. Subsequently, the advance is at a slower rate as larger portions of the teeth become active. Finally, the hob is not advanced at all but rather is held in fixed (but rotating) position in a dwell condition for finish cutting of the workpiece. As the hob and the workpiece start to rotate at the start of the cycle by the starting mechanism, air is admitted to the piston 196 through the air line 216. The hob is thus quickly advanced along its axis from its retracted position into an initial hobbing position, whereupon the cam 48 feeds the hob along the workpiece axis to the workpiece. The hob remains in its axially advanced or hobbing position until cam 48 makes a complete rotation and the feed mechanism by virtue of cam portion 50 allows the carriage to quickly retract axially relative to the workpiece. It is seen that the retraction of the carriage causes the stop 218 to engage and actuate the switch 222 which in turn operates the control to reverse the effective air supply in the piston 196 for the rapid retraction of the hob from its axially advanced or hobbing position to its retracted position. The finished workpiece is removed and a new workpiece is inserted. As will be understood, when the hob is in the axially advanced or hobbing position, cam portion 50 of cam 48 which controls the feed, assures that the hob is moved axially of the workpiece from dwell position to the initial feed position just clear of the workpiece before switch 222 actuates the piston to cause the hob to retract along its axis to its retracted or starting position. As will be understood when the machine is started by the starting mechanism, there is an override for the switch 222 which allows the starting mechanism to start the machine after the insertion of a new workpiece, so as to recycle the machine as just described.

The specific example of the machine as herein shown and described is exemplary only. Various changes will no doubt occur to those skilled in art, and will be understood as forming a part of the invention insofar as they fall within the spirit and scope of the appended claims.

The invention is claimed as follows:

1. A hobbing machine comprising a base, means on said base for supporting a gear blank to be hobbed as a face type gear, a hob carriage mounted on said base for movement toward and away from said blank supporting means for hobbing of said blank, a hob carried by said carriage, means for rotating said hob and said blank holding means in timed relation, means for moving said carriage toward said blank supporting means and for thereafter moving said carriage away from said blank supporting means, and means for moving said hob axially thereof between hobbing and retracted positions in timed relation with the movement of said carriage, the movement of said carriage being substantially transverse of said hob, said hob moving means including a rack and pinion, and a crank operated by said pinion.

2. A hobbing machine as set forth in claim 1 wherein the crank comprises a crank pin eccentrically rotatable with said pinion, and further including means mounted on said carriage and supporting said hob, said supporting means having a slot receiving said crank pin.

3. A hobbing machine as set forth in claim 1 in which said rack is reciprocated by an air piston.

4. A hobbing machine comprising a base, means on said base for supporting a gear blank to be hobbed as a face type gear, a hob carriage mounted on said base for movement toward and away from said blank supporting means substantially axially thereof, a hob carried by said carriage, means including a rack and pinion for advancing and retracting said hob axially thereof and substantially transversely of the blank supporting means between hobbing and retracted positions, means for rotating said hob and said blank supporting means in timed relation, means including a substantially spiral cam and spring means for moving said carriage toward said blank supporting means substantially axially of said blank supporting means, and means for thereafter moving said carriage away from said blank supporting means.

References Cited in the file of this patent

UNITED STATES PATENTS

| | | |
|---|---|---|
| 1,426,680 | Simmons | Aug. 22, 1922 |
| 1,465,303 | Henry | Aug. 21, 1923 |
| 1,879,196 | Greene | Sept. 27, 1932 |
| 1,965,002 | Richer | July 3, 1934 |
| 2,093,050 | Marsilius | Sept. 14, 1937 |
| 2,214,504 | Lux | Sept. 10, 1940 |
| 2,364,694 | Cetrule | Dec. 12, 1944 |
| 2,374,254 | Zimmermann | Apr. 24, 1945 |
| 2,451,447 | Ransome | Oct. 12, 1948 |
| 2,757,577 | Bean et al. | Aug. 7, 1956 |
| 2,932,923 | Carlsen | Apr. 19, 1960 |